Oct. 10, 1944.  R. B. HITCHCOCK  2,360,131
CORN HARVESTER
Filed March 24, 1941  4 Sheets-Sheet 1
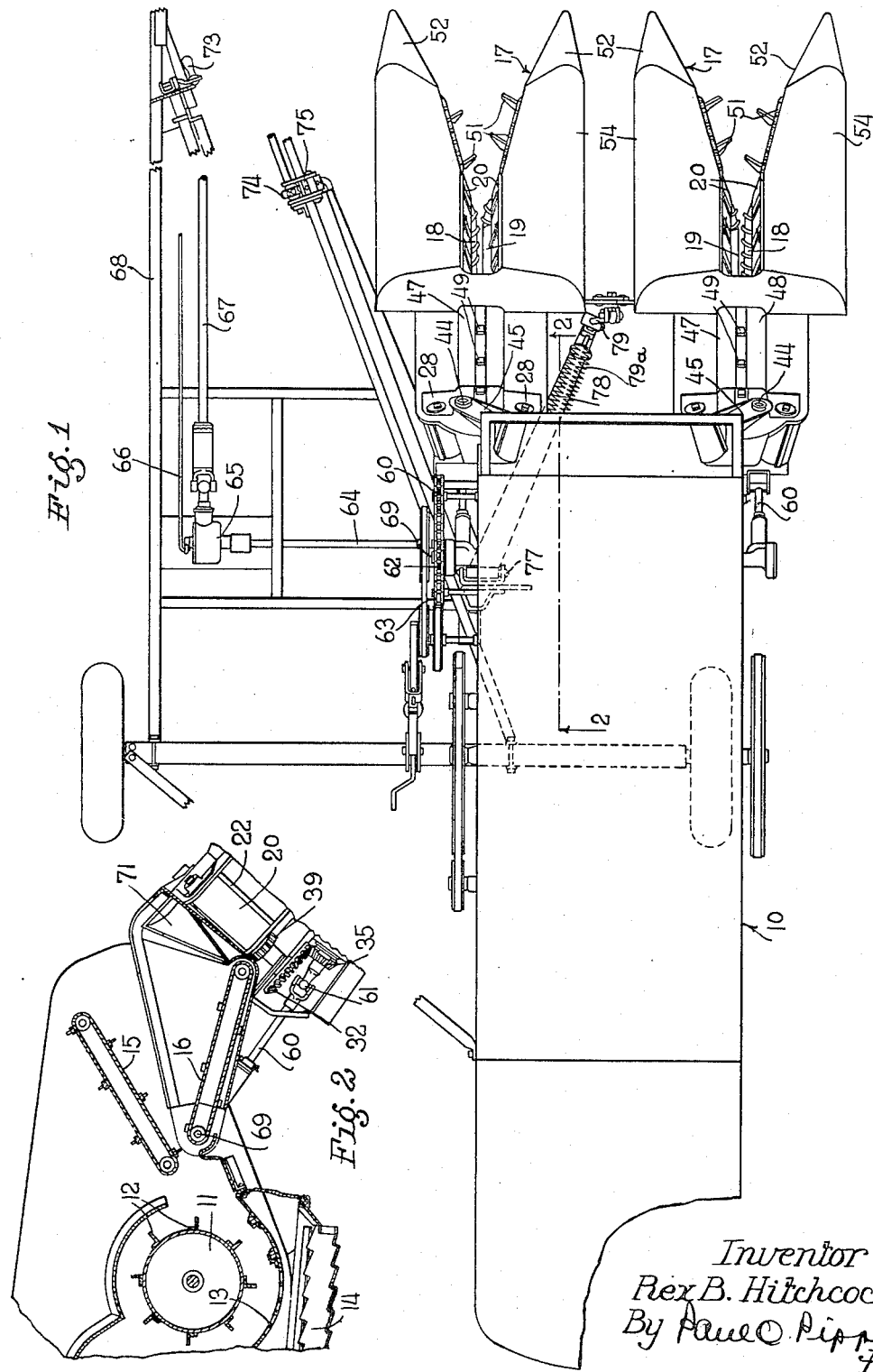
Inventor
Rex B. Hitchcock
By Paul O. Pippel
Atty.

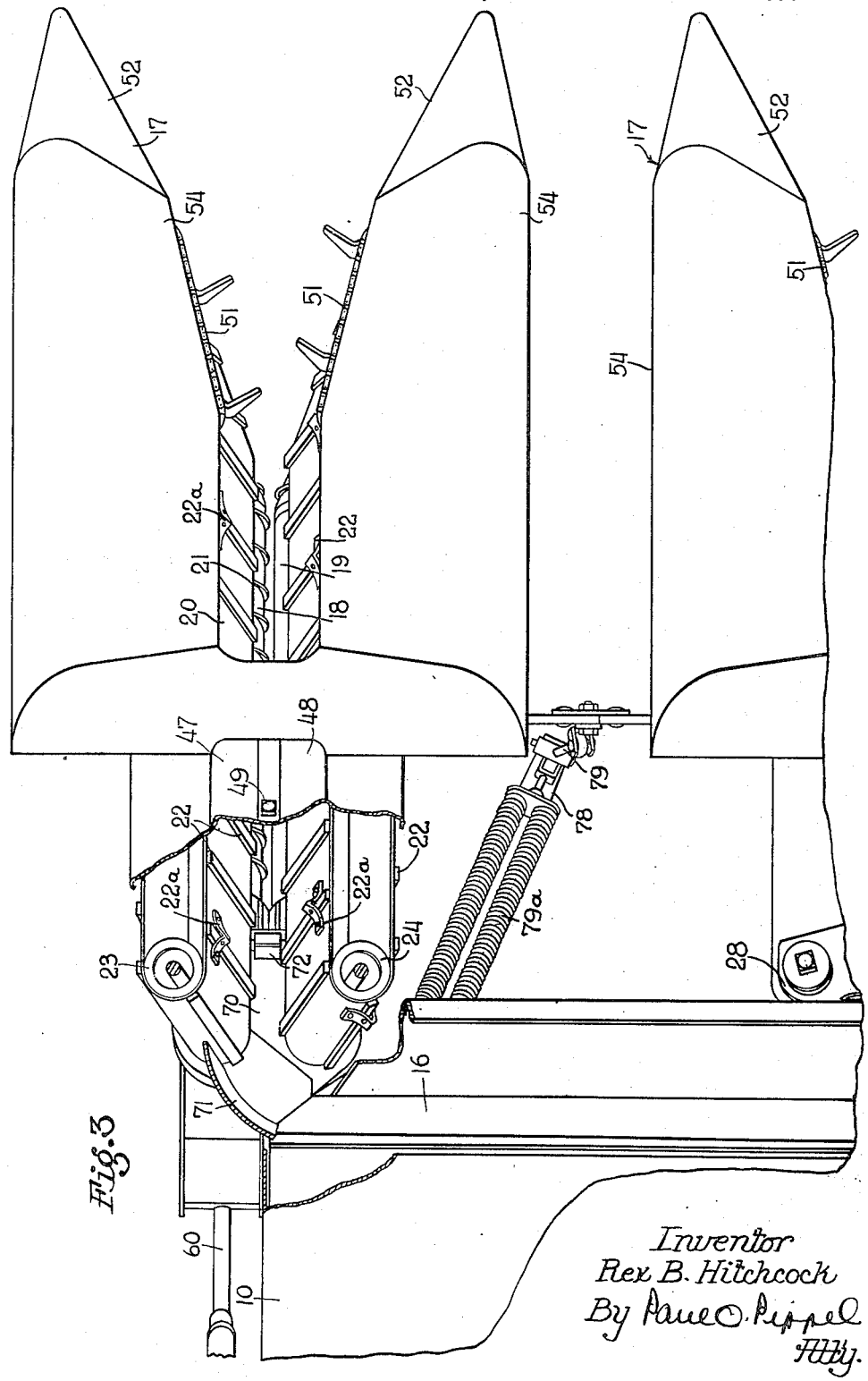

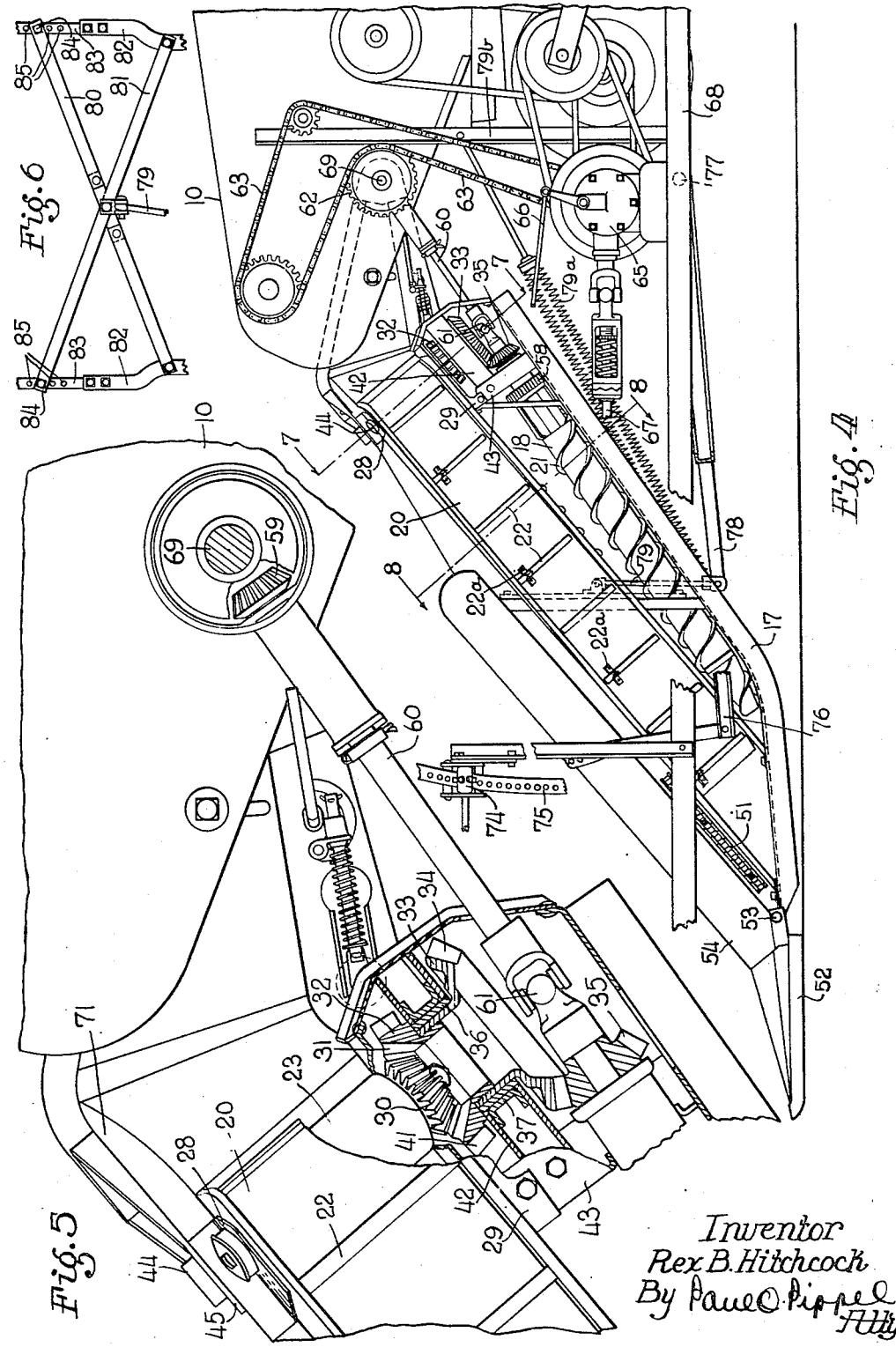

Oct. 10, 1944. R. B. HITCHCOCK 2,360,131
CORN HARVESTER
Filed March 24, 1941 4 Sheets-Sheet 4
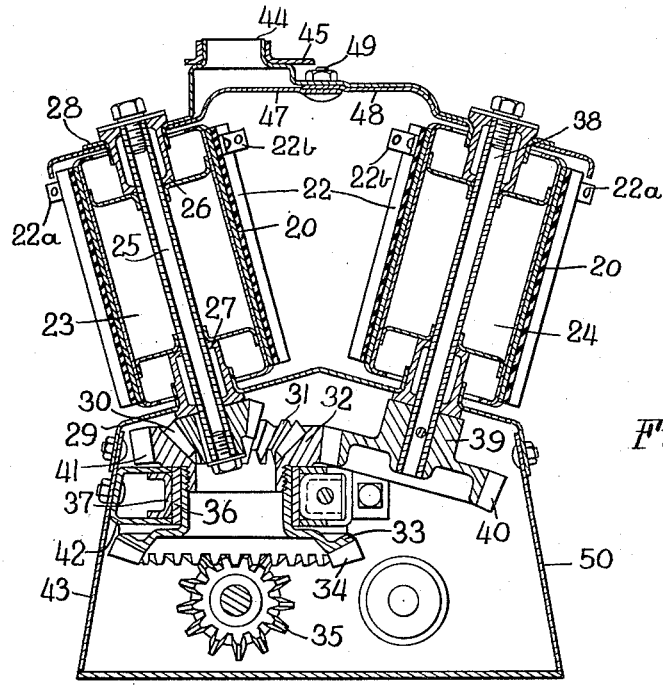
Fig. 7
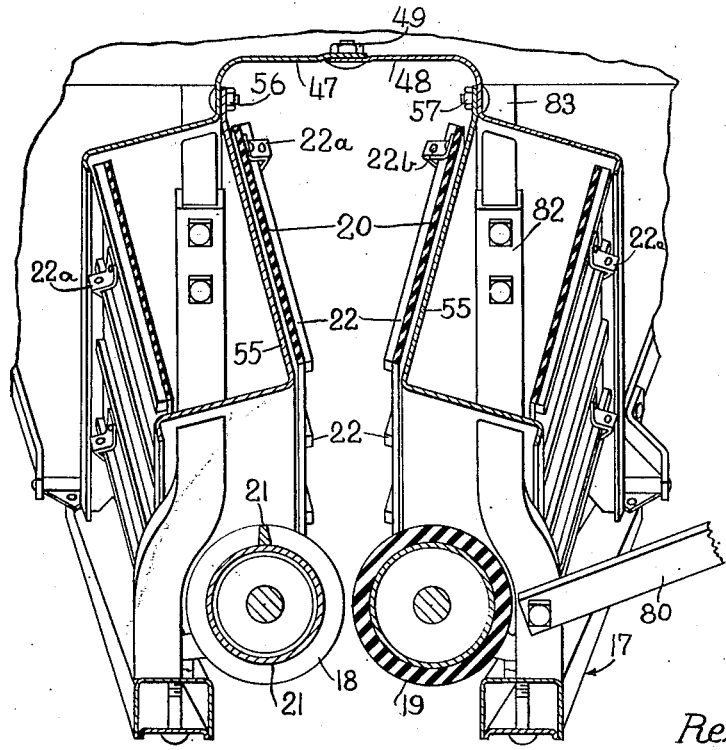
Fig. 8
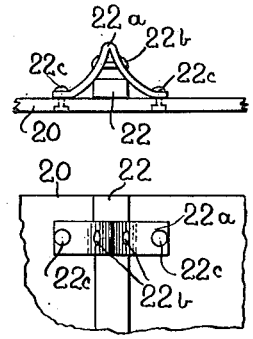
Fig. 9
Fig. 10
Inventor
Rex B. Hitchcock
By Paul C. Pippel
Atty.

Patented Oct. 10, 1944

2,360,131

UNITED STATES PATENT OFFICE 2,360,131

CORN HARVESTER

Rex B. Hitchcock, Rock Island, Ill., assignor to International Harvester Company, a corporation of New Jersey Application March 24, 1941, Serial No. 384,780

15 Claims. (Cl. 56—103)

This invention relates to a corn harvester. More specifically it relates to a corn harvester composed of a thresher body adapted for use for grain harvesting, and corn picking units which include belts for snapping corn rather than snapping rolls.

Corn ears are usually removed from the stalks by means of snapping rolls. There is normally considerable shelling of the ears because of the rough handling and pinching of the ears by the rolls, and in hybrid corn the shelling is greatly increasing.

Many farmers need both a corn picker and a harvester thresher, but find it impossible because of the cost to own both machines. Consequently, a harvester thresher which may be converted to a corn picker is of considerable advantage, in that it enables a farmer to have, in effect, the two types of machines at little more than the cost of one machine.

An object of the present invention is to provide an improved corn harvester.

A further object is the provision of improved means for snapping corn ears.

Another object is to provide an improved means for driving the picking mechanism of a corn picker.

A still further object is the provision of a corn picker which may be made from some of the essential parts of a harvester thresher.

According to the present invention, picker units are mounted at one end of an elongated thresher body of a harvester thresher in place of the usual cutter-bar, platform, and elevator. Each picking unit comprises essentially a pair of rolls, which serve only to guide corn stalks, and a pair of belts which run along the rolls and serve to snap the ears from the stalks.

In the drawings:

Figure 1 is a plan view of the corn picker of the present invention;

Figure 2 is a sectional view taken along the lines 2—2 of Figure 1;

Figure 3 is a plan view of a portion of the corn picker with parts removed;

Figure 4 is a side view of the front part of the picker;

Figure 5 is a side view, similar to Figure 4, but showing only a portion of what is shown in Figure 4 and having certain parts removed;

Figure 6 is a detail view showing the means for adjusting the spacing between the picker units;

Figure 7 is a sectional view taken along the line 7—7 of Figure 4;

Figure 8 is a sectional view taken along the lines 8—8 of Figure 4; and,

Figures 9 and 10 are detail views showing the attachment of a finger to a belt.

The corn picker of the present invention includes an elongated body or housing 10 forming the thresher housing of a grain harvester including a cutter-bar and a grain platform, such as shown in the application of Albert B. Welty, Serial No. 365,952, filed November 16, 1940. Figure 2 shows the essential parts of the mechanism contained in the housing 10, in so far as the present invention is concerned. This mechanism comprises a cylinder 11 having bars 12 thereon. A concave 13 is located beneath the cylinder 11 and beneath the concave shaker screens 14. The spacing between the cylinder 11 and the concave 13 is set so as to accommodate ears of corn rather than grain. In front of the cylinder is an upper conveyer 15 and a lower conveyer 16. In the present invention only the lower conveyer 16 is used for conveying corn ears from picking units presently to be described.

As seen in Figure 1, picking units 17 are connected to one end of the body 10. The essential parts of each picking unit are a pair of rolls 18 and 19 and a pair of belts 20. The roll 18 is formed of iron or steel and has a spiral rib 21. The roll 19 is formed of rubber. The belts 20 are formed of rubber, or of suitable flexible material, and have transversely extending ribs 22. The belts extend in the same direction as the rolls 18 and 19 and slightly out of parallelism with them, as seen in Figure 4.

Fingers 22a, formed of suitable flexible material or fabric, are secured over alternate ribs 22 on each belt adjacent the upper side thereof. As shown in Figures 9 and 10, each finger is formed of material folded upon itself and secured by a rivet, as at 22b, and secured at its ends to the belt by rivets, as at 22c.

As shown in Figure 7, pulleys 23 and 24 are within the upper ends of the belts and serve to drive them. The pulley 23 is secured to a shaft 25, which is journaled, by means of bearing members 26 and 27, in shell members 28 and 29 forming part of the housing and supporting structure of the picking mechanism. A bevel gear 30 is secured to the lower end of the shaft 25 and is in mesh with bevel gear teeth 31 on the inner surface of a gear member 32. The gear member 32 is secured to a gear member 33 having bevel gear teeth 34 in mesh with a bevel gear 35, which is connected with a source of power presently to be described. The gear members 32 and 33 have a bearing sleeve 36 secured about them, which is journaled on a part 37 connected with the body 10 so as to have no movement with respect thereto. The pulley 24 is secured to a shaft 38 journaled in the housing members 28 and 29 in the same way as the shaft 25. A gear member 39 is secured to the lower end of the shaft 38 and has teeth 40, slightly beveled, in mesh with external gear teeth 41 on the gear member 32, also slightly beveled. As previously stated, the gears 32 and 33 are journaled by means of the sleeve 36 on the part 37, fixed with respect to the body 10. This same part 37 serves as a pivotal support for the entire picking unit, a supporting member 42 being journaled on the part 37 and secured to a housing member 43 secured to the housing member 29. The housing member 28 has a cylindrical extension 44 which is journaled in a part 45, also secured with respect to the body 10. Thus, the pivot axis of the picking unit with respect to the body 10 lies on the centers of the cylindrical extension 44 and the bearing sleeve 36.

It will be seen from Figure 7 that the shafts 25 and 38, forming the axes of rotation for the pulleys 23 and 24, are at a slight angle with one another as well as with the pivot axis of the picking unit with respect to the body 10. Drive of the pulleys 23 and 24 from the bevel gear 35 is made possible through the gear member 32, which has inner and outer bevel gear teeth which allow the driving of the pulleys at an angle with respect to the pivot axis and with respect to one another, and in the same direction.

A housing member 47 reenforces the housing member 28 and is connected thereto and to a complementary housing member 48 by means of a bolt and nut 49. A housing member 50 is secured to the housing member 29 on the side thereof opposite the housing member 43. Pulleys, not shown, similar to pulleys 23 and 24, fit within the lower end of the belt 19 and are connected with gathering chains 51 which they drive.

Gathering points 52 are pivotally connected, as at 53, to housing members 54, which cover the pulleys and portions of the belts and leave open the space between the belts. As seen in Figures 3, 7, and 8, this space is generally V-shaped being narrower at the bottom than at the top, and the rolls 18 and 19 are more closely spaced beneath the belts. As seen in Figure 8, the sides of the belts 20, which face one another, rest upon sheet metal parts 55 secured by means of bolts and nuts 56 and 57 to the housing members 47 and 48. These sheet metal parts support the belts and thus maintain the V-shaped spacing between them.

As seen in Figures 4 and 5, the bevel gear 35 is secured to the upper end of the roll 18 and serves to drive the same. A gear section 58 on the roll 18 is in mesh with a similar gear section, not shown, on the roll 19 and thus transmits drive to the roll 19. Drive of the bevel gear 35 comes from a bevel gear 59 through a shaft 60 and a universal joint 61. Bevel gear 59 is driven by another bevel gear, not shown, secured to a sprocket 62, mounted on the side of the housing 10 and driving a chain 63. The chain 63 meshes with a gear, not shown, secured to a shaft 64 driven through a gear box 65, including a clutch having a control member 66. The gear box is driven by means of a shaft 67 connected with the power take-off shaft of a tractor, not shown, connected with the picker by means of a draw frame 68. The driving of the cylinder 11 from the shaft 64 is more completely shown in the aforementioned Welty application. The sprocket 62, which drives the gear 59, is secured to a shaft 69 which it drives, and which in turn drives the elevator 16.

As seen in Figure 3, which shows the housing structure surrounding the upper ends of the belts 19 broken away, there is a plate member 70 beneath the upper ends of the belts. A curved guide 71 extends from the end of the outer belt 19 to the conveyer 16.

The operation of the corn picker is in the usual manner; that is to say, the corn picker is pulled through a field of corn with the rows passing between the gathering points 17. Gathering chains 51 facilitate the entry of the stalks between rolls 18 and 19, which have no snapping action but simply serve to guide the stalks between them as the picker moves along, the spiral rib on the roll 18 serving to guide positively. As the picker moves along, the belts 20 in effect move upwardly along the stalks and gently snap the ears therefrom. The sides of the belts, facing one another, move rearwardly and so convey the ears snapped upwardly and finally onto the plate member 70 and onto the conveyer 16 with the aid of the guide member 71, and finally into engagement with the cylinder 11. The ribs 22 on the belts insure a positive conveying of the ears, and the fingers 22a facilitate movement of trash. A paddle wheel 72, mounted for rotation on an axis transverse to the direction of movement of the belts, is positioned beneath the upper ends of the belts adjacent the plate 70, and serves to prevent clogging of trash at the edge of the plate 70.

Vertical adjustment of the picking units with respect to the thresher body is effected about the axis of the shaft 69 by means of an adjusting crank 73, which rotates a pinion 74 engaging a perforated rack 75 connected with a member 76 pivotally connected to a pin 77 and secured to a member 78, also connected to the pin and extending forwardly to a connection with a link 79 connected at the intersection of cross-members 80 and 81, connected at their ends to frame parts 82 and 83 of the picking units. Figure 6 shows the arrangement of the link 79, the cross members 80 and 81, and the frame members 82 and 83, and Figure 8 shows how these frame members are attached to the picker units. A counterbalancing spring 79a extends from connection of the link 79 with the member 78 to a connection with an angle member 79b secured to the housing 10.

As previously stated the picking units are pivotally mounted upon the housing 10 upon an axis extending through the centers of the bearing sleeve 36 and the cylindrical extension 44 of the housing member 28, as shown in Figure 7. Pivotal movement of the picking units toward or away from one another effects an adjustment of the spacing between the picking units and enables the picker to operate in different row spacings. The movement described is not pivoting in the ordinary sense of the word, since, during operation, the picker units must be fixed against relative movement. This fixing is accomplished by means of the members 80 and 81 which are secured at their ends to the frame members 82 and 83 of the picker units and to one another at their point of intersection. The upper ends of the members 80 and 81 are secured to the frame members 83 by bolts 84, which may extend through any one of a number of holes 85. Adjustment of the spacing between the picking units is effected by shifting of the bolts 84 from one hole to another.

It will be apparent from the foregoing description that a new and novel corn picker has been provided. One important feature of the picker is the substitution of snapping belts for snapping rolls, and the use of rolls to guide corn stalks as the ears are being snapped. A further feature is the attachment of snapping or picking units to one end of a thresher body of a grain harvester in place of the usual cutter-bar, grain platform and elevator. A third feature is adjustment of the spacing between the picking units by means of a shifting of cross-members which interconnect the units.

The intention is to limit the invention only within the scope of the appended claims.

What is claimed is:

1. In a corn picker, a pair of rolls mounted parallel to one another so as to pass corn stalks between them, and a pair of belts positioned above and parallel to the rolls and parallel to one another and diverging from one another in a direction away from the rolls so as to form a space narrow at the bottom and wide at the top for receiving and snapping ears on stalks passed between the rolls.

2. In a corn picker as specified in claim 1, each belt having fingers secured adjacent the top side and extending toward the other side for aiding the passage of trash between the belts.

3. A corn picker comprising a framework, means for moving the framework over the ground in a certain direction, and a pair of belts extending in the direction of movement of the framework over the ground in parallel side-by-side relation so as to enclose a space between them widening out from bottom to top for receiving ears of corn on stalks passing between the belts and for snapping the ears from the belts.

4. A corn picker comprising a framework, means for moving the framework over the ground in a certain direction, a pair of belts extending in the direction of movement of the framework over the ground in parallel side-by-side relation so as to enclose a space between them widening out from bottom to top for receiving ears of corn on stalks passing between the belts and for snapping the ears from the belts, and means for moving the belts with respect to the framework in a direction opposite to that in which the framework is moved over the ground.

5. A corn picker comprising a framework, means for moving the framework over the ground in a certain direction, and a pair of belts extending in the direction of movement of the framework over the ground in parallel side-by-side relation so as to enclose a space between them widening out from bottom to top for receiving ears of corn on stalks passing between the belts and for snapping the ears from the belts, the belts being inclined upwardly in the direction opposite to that in which the framework is moved over the ground.

6. A corn picker comprising a framework, means for moving the framework over the ground in a certain direction, a pair of belts extending in the direction of movement of the framework over the ground in parallel side-by-side relation so as to enclose a space between them widening out from bottom to top for receiving ears of corn on stalks passing between the belts and for snapping the ears from the belts, the belts being inclined upwardly in the direction opposite to that in which the framework is moved over the ground, and means for moving the belts with respect to the framework in the same direction as the belts are inclined upwardly.

7. A corn picker comprising a framework, means for moving the framework over the ground in a certain direction, a pair of belts extending and being inclined upwardly in the direction of movement of the framework in parallel side-by-side relation so as to enclose a space widening from bottom to top for receiving and snapping ears of corn, means for moving the belts with respect to the framework in a direction opposite to that of movement of the framework over the ground, and means positioned beneath the belts for guiding the corn stalks for movement with respect to the framework in the same direction as the movement of the belts with respect to the framework.

8. A corn picker comprising a framework, means for moving the framework over the ground in a certain direction, a pair of belts having transverse ribs and extending and being inclined upwardly in the direction of the movement of the framework over the ground in parallel side-by-side relation so as to enclose a space widening out from bottom to top, means moving the belts in a direction opposite to the movement of the framework over the ground, and a pair of guide rolls positioned beneath the belts and extending parallel thereto.

9. A corn harvester comprising a framework, a picking unit pivotally mounted thereon and including a pair of belts in the form of elongated loops extending parallel to one another in the direction of their lengths and at a slight angle to one another in a plane transverse to their lengths so as to enclose between them a space wider at one side than at the other, driving pulleys in one end of the belt loops having their axes extending at a slight angle to one another, and means for driving the pulleys including a first member mounted on the pivot axis of the picking unit with respect to the framework and having internal and external driving surfaces, a second member engaging the internal surface of the first member and driving one driving pulley, and a second member engaging the external surface of the first member and driving the other driving pulley.

10. A corn harvester comprising a framework, a pair of belts in the form of elongated loops mounted on the framework and extending parallel to one another so as to enclose between them a space for receiving and snapping ears of corn, driving pulleys in one end of the belt loops, and means for driving the pulleys comprising a member having internal and external driving surfaces, means transmitting drive from the external surface of the member to one pulley, and means transmitting drive from the internal surface of the member to the other pulley.

11. A corn picker comprising a pair of belts in the form of elongated loops extending side by side so as to enclose a space between them narrower at the bottom than at the top, means for driving the belts so as to move adjacent ends in the same direction, a stationary member positioned at one end of and beneath the belts, and a member positioned adjacent the stationary member and adapted for rotation about an axis transverse to the direction of movement of the belts.

12. A corn picker comprising a pair of belts positioned in side-by-side parallel relation so as to enclose a space between them widening out from bottom to top for receiving and snapping ears of corn on stalks passing between the belts, each belt having transverse ribs and fingers secured adjacent the top side at alternate ribs and extending toward the other belt for aiding removal of trash.

13. A corn harvester comprising a framework, a pair of parallel rolls, means rotatably mounting the rolls on the framework, and spaced upwardly-extending corn-ear-removing means positioned over the rolls and moving continuously in one direction lengthwise of the rolls and enclosing a space for the reception of corn ears, and means mounting the ear-removing means on the framework.

14. A corn harvester as specified in claim 13, the said ear removing means diverging outwardly and the space above the rolls thereby widening from bottom to top.

15. A corn picker comprising a supporting means, a pair of belts positioned in spaced upwardly-diverging side-by-side relation so as to enclose a space between them widening out from bottom to top for receiving and snapping ears of corn on stalks passing between the belts, and means mounting the belts on the supporting means.

REX B. HITCHCOCK.